Sept. 29, 1970  R. R. WALTON  3,531,103
FABRIC HANDLING
Filed June 21, 1967  7 Sheets-Sheet 1

Inventor
Richard R. Walton
By his Attorney

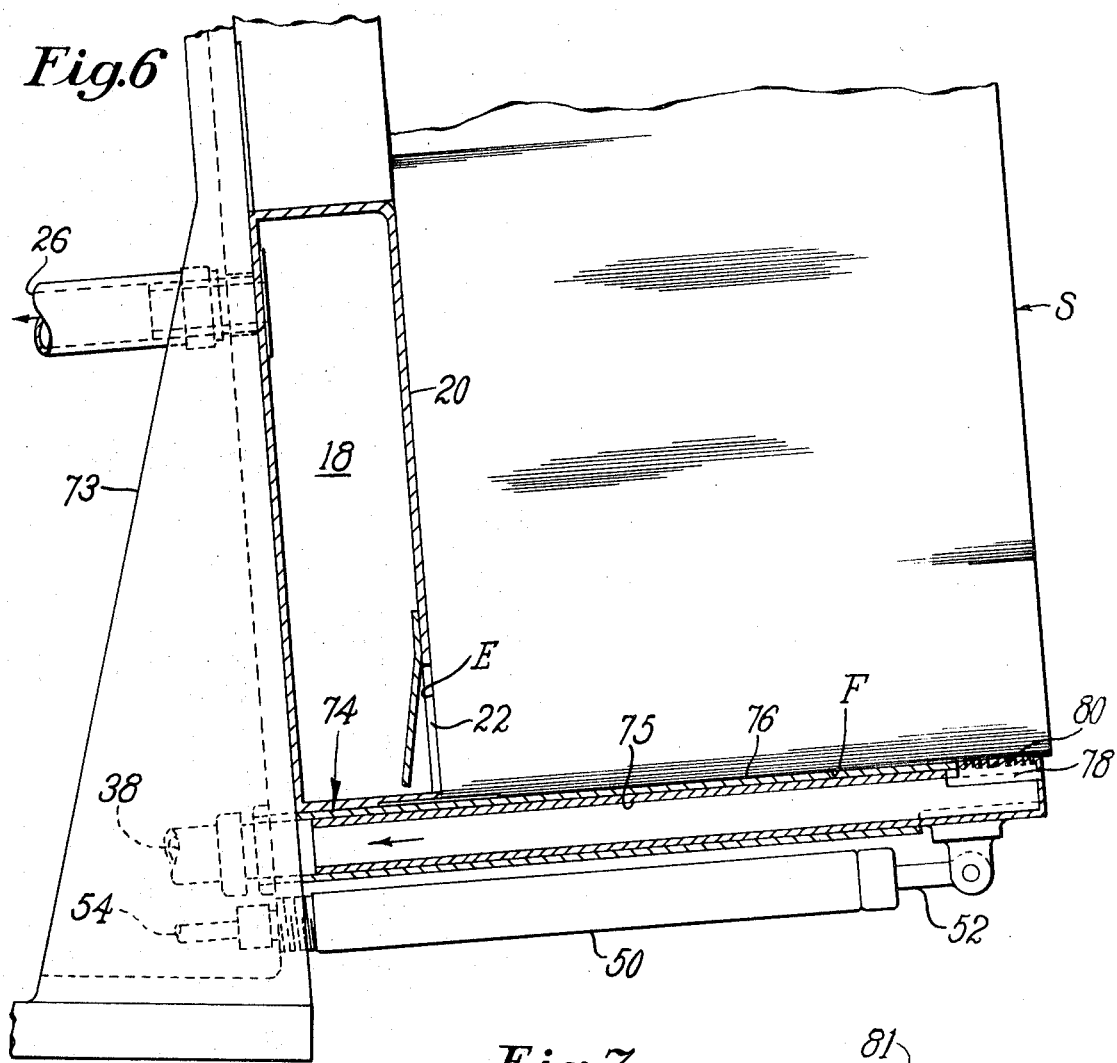
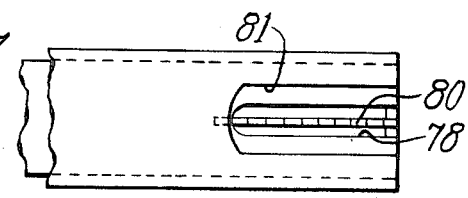
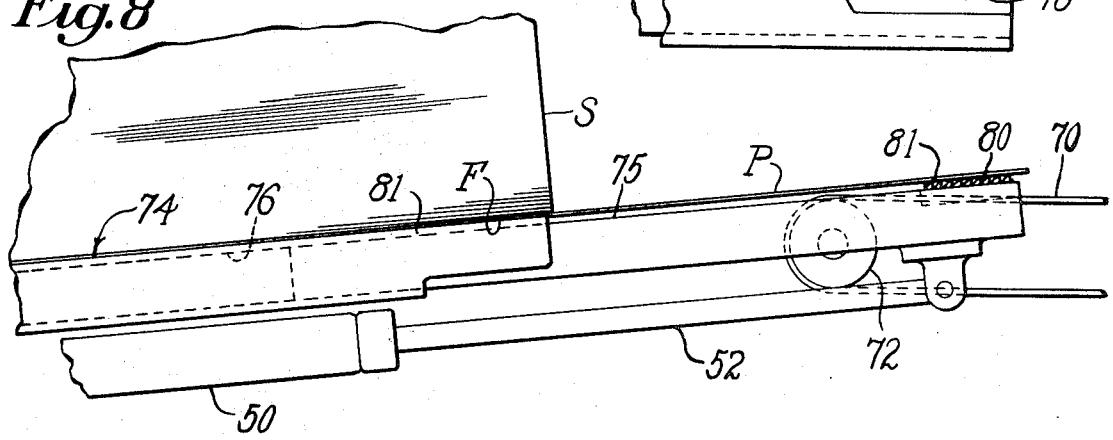

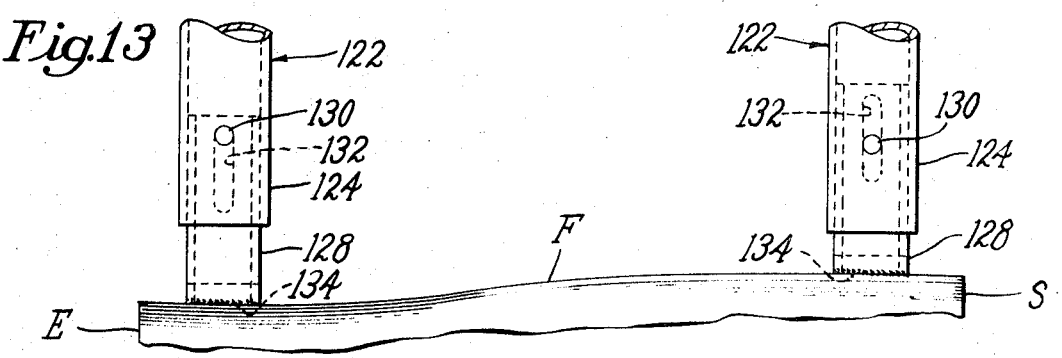
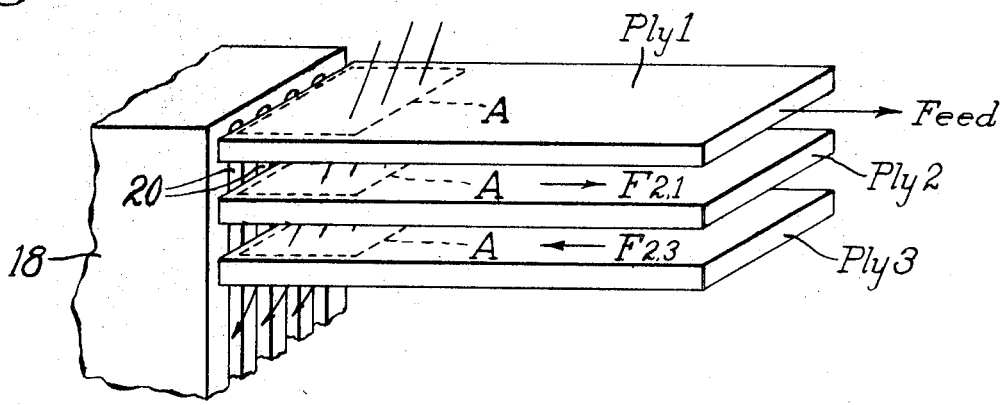

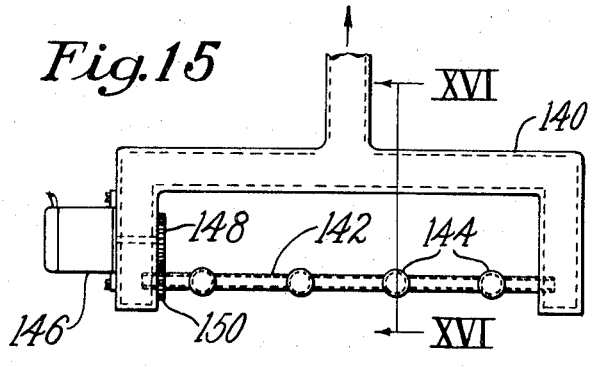
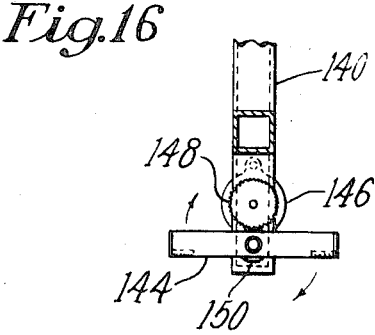
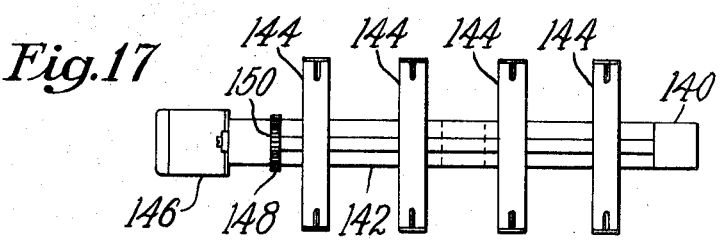
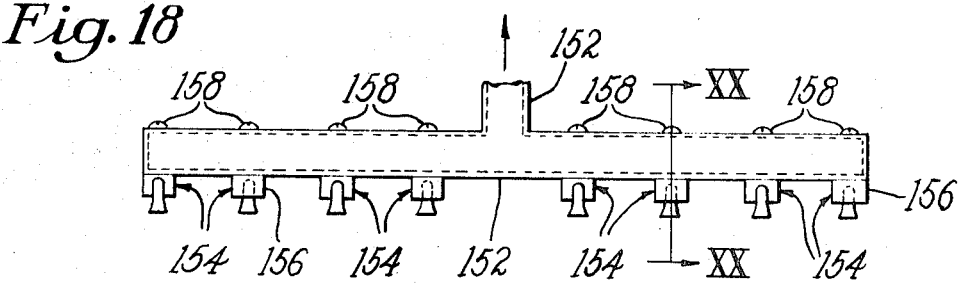
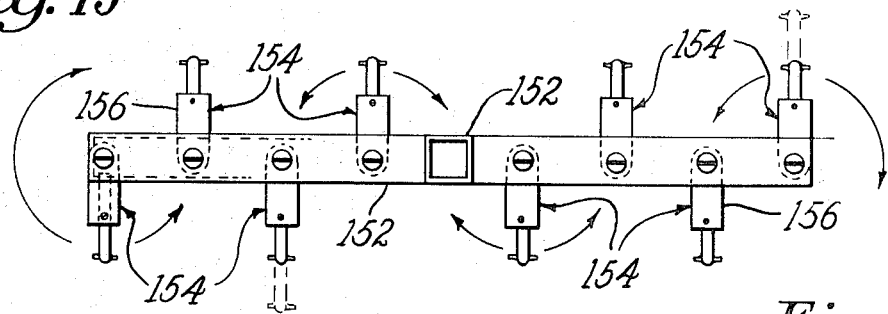
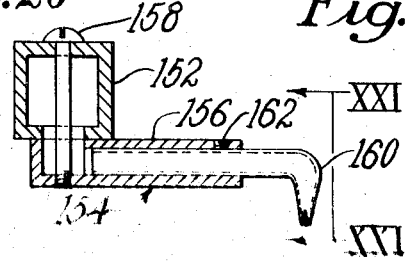
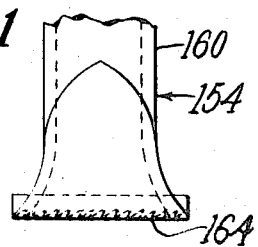
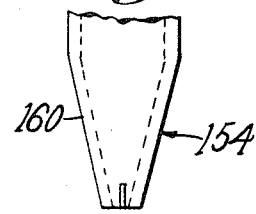

United States Patent Office 3,531,103
Patented Sept. 29, 1970

3,531,103
FABRIC HANDLING
Richard R. Walton, Boston, Mass., assignor to USM Corporation, Flemington, N.J., a corporation of New Jersey
Filed June 21, 1967, Ser. No. 647,784
Int. Cl. B65h *3/08*
U.S. Cl. 271—26                                    20 Claims

ABSTRACT OF THE DISCLOSURE

A machine for feeding fabric sheets singly from a stack of sheets and having novel means for effecting the release of only one sheet from the stack during each pick-off operation. The pick-off device of the machine is effective to cleanly remove a single fabric ply of regular or irregular shape from a stack and deposit the ply in one of a plurality of positions at a work station, conveyor or on another stack. It can position the sheet with a high degree of accuracy.

BACKGROUND OF THE INVENTION

This invention relates to a device for feeding flexible sheet material and in particular to a method of and apparatus for successively removing fabric pieces or the like from a stack and depositing the pieces in predetermined orientation.

Heretofore, various machines have been proposed in the prior art for use in the handling and transfer of fabric sheets. Devices of this type have been disclosed in U.S. Patent application Ser. No. 571,865, filed Aug. 11, 1966 in the name of Richard R. Walton et al., now Pat. No. 3,369,803, issued Dec. 5, 1967 and in application Ser. No. 556,606, filed June 10, 1966 in the name of Richard R. Walton, now Pat. No. 3,356,237, issued Dec. 5, 1967. Further devices are set forth in such prior art as U.S. Pats. Nos. 3,168,307 and 3,168,308, issued in the names of Richard R. Walton and G. E. Munchbach. However, the automating of the garment, laundry and other fabric industries has remained slow in progress for a variety of reasons. The work pieces, whether of fabric or otherwise, are generally of widely varying and peculiar characteristics. While the aforementioned devices have proved successful in operation on many types of fabrics, it is recognized that there are types and shapes of fabric plies which are not easily handled by these aforementioned devices and additionally there are positioning requirements which are not fully met by these devices.

As alluded to in the prior art, even when fabrics to be handled are of reasonably constant nature, such factors as the limpness of the material, surface friction or adhesion, compressibility, low mass, and textural composition make manual handling difficult; and tend to make the fabric non-susceptible to mechanical feeding. Additionally, the limitless number of fabric shapes which must be handled by a fabric feeding machine to make it readily acceptable to the garment industry present further difficulties.

It is therefore, a primary object of the present invention to provide a fabric handling machine which will remove a single ply of fabric from a stack thereof and precisely position the pieces at a predetermined location, while maintaining the original accuracy of alignment of sheets remaining in the stack.

It is a further object of the present invention to provide a method and means for feeding flexible fabric sheets singly from a stack of workpieces, which is more versatile and adaptable to a greater number of fabric materials than prior art fabric feeding machines.

Another object of the present invention is to provide a fabric pick-off and feeding device which is simple in construction and adaptable for use with a variety of fabric shapes.

A further object of the invention is to provide a fabric pick-off and feeding device which is effective to singly move a fabric workpiece or portion thereof with respect to a support, or stack of workpieces, and to deposit the workpiece in predetermined position.

SUMMARY OF THE INVENTION

The various objects of the invention are achieved by providing a novel apparatus and method for removing fabric sheets from a stack and transporting them precisely to a predetermined position. The stacks upon which a machine embodying the invention would commonly operate have edges of all the pieces exactly aligned, e.g. with the alignment that results from cutting a desired work piece shape (as by a textile saw or single die cut) from a plurality of superimposed pieces of fabric. According to the invention, such a stack is supported in edge alignment, e.g. with the stack edge vertical, and mechanism such as a driven screw bodily moves the stack relative to a transfer device. The apparatus, as disclosed, comprises a hold-back device, and a transfer device which operate together to feed the face sheet from a stack of fabric sheets to a precise location without distortion of the sheet or disturbance of the underlying plies.

The hold-back device when disposed as herein disclosed adjacent the stack of sheets is effective to apply a pressure differential to the sheets in the region of the face of the stack. With the device so positioned as to provide a first pressure drop from the face of the stack inwardly across the thickness of the face sheet, and a second pressure drop across the thickness of the second sheet, sheets may be removed singly from the face of the stack without disturbing the integrity of the stack, or the underlying plies. Advantageously, vacuum acting on the edge surface in the region of the face is effective to provide the pressure differential; advantageously, the hold back device has a positioning surface adjacent an edge surface of the stack against which the stack is held.

The novel transfer device is adapted to positively engage the top sheet of the fabric stack and draw it away from the positioning device. The transfer device comprises a positive fabric gripping element, a limiting surface located adjacent the gripping element for limiting the engagement of the element with a piece of fabric, and a vacuum conduit connected to a vacuum source for drawing a piece of fabric against the gripping element and the limiting element. A means is further provided in the device for moving the gripping element and the associated vacuum conduit alternately from adjacent the support to a position spaced therefrom whereby pieces of fabric are precisely transported to a predetermined position.

In the method aspect the present invention provides for successively removing top fabric sheets from a stack thereof by first applying a vacuum to at least one surface of the stack, positioning a pick-off means adjacent the face of the stack, causing the pick-off means to facially engage a piece of fabric disposed on the face of the stack and then moving the pick-off means to a second position with the fabric peice engaged therewith.

BRIEF DESCRIPTION OF THE DRAWINGS

For a more complete understanding of the invention, reference should be had to the accompanying drawings, wherein:

FIG. 6 is an elevational view partially in section showing an alternate embodiment of a machine for feeding fabric sheets singly from a stack in accordance with the teachings of the present invention;

FIG. 7 is a fragmentary plan view showing a portion of the structure of FIG. 6 and in particular showing details of the novel pick-up means embodied in the machine of FIG. 6, taken on an enlarged scale for clarity;

FIG. 8 is a fragmentary elevational view showing a portion of the feeder structure during operation of the embodiment of FIG. 6;

FIG. 13 is a fragmentary elevational view showing the ply engaging portion of the structure of FIG. 9 taken on an enlarged scale for clarity;

FIG. 14 is a schematic diagram showing a principle under which the vacuum hold-back structure of FIGS. 1 through 13 is considered to operate;

FIG. 15 is an elevational view showing yet another embodiment of a pick-off device constructed in accordance with the teachings of the present invention;

FIG. 16 is a sectional elevational view taken along the lines XVI—XVI of FIG. 15 showing details of the pick-off structure;

FIG. 17 is a bottom plan view of the pick-off device of FIG. 15 showing further details of the pick-off structure;

FIG. 18 is an elevational view showing still another embodiment of a pick-off means constructed in accordance with the teachings of the present invention;

FIG. 19 is an elevational view of the device of FIG. 18 showing details of the structure;

FIG. 20 is a sectional elevational view taken along the lines XX—XX of FIG. 18 showing details of the structure taken on an enlarged scale;

FIG. 21 is fragmentary elevational view taken along the lines XXI—XXI of FIG. 20 showing that portion of the structure on a greatly enlarged scale for clarity; and FIG. 22 is a side elevational view of the structure of FIG. 21 showing further details of that structure.

DESCRIPTION OF THE PREFERRED EMBODIMENTS

Figure 1:
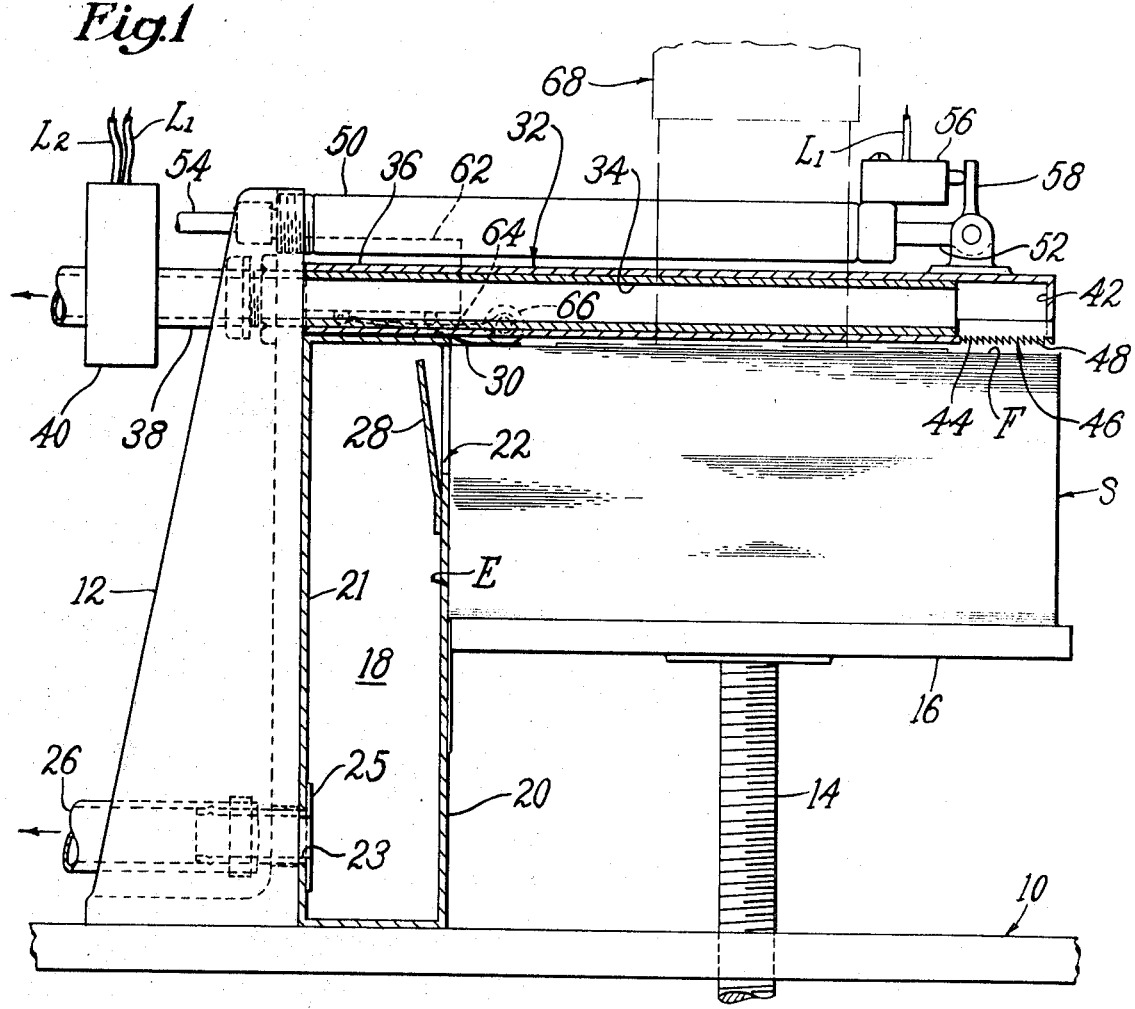
FIG. 1 is an elevational view partially in section showing a machine for feeding fabric sheets singly from a stack, in accordance with the teachings of the present invention.

Referring now to the drawings, in particular FIGS. 1 through 5, there is shown a frame 10 having a support bracket 12 mounted thereon. Extending through the frame 10 is a screw 14 having a support table 16 located at its upper end; a drive means (not shown) is connected at its lower end. The support table 16, as shown supports a stack S of fabric sheets located on its upper surface.

As used herein the term "fabric sheets" is intended to mean all usual types of textile fabrics including woven fabrics, knit goods, non-wovens and other air permeable textile and textile-like materials.

The stack S has a free upper surface or face F and an edge surface E and, as provided in the garment industry, is generally formed by cutting a desired shape from a plurality of stacked fabric pieces with a single cut, and is therefore quite compact in nature with sheets accurately aligned with one another as provided to the machine. While the fabric stack S is shown to be supported directly on the upper surface of the support table 16, in many instances it might be desirable to present the stack to the device on a pallet, which would be supported on the table 16 in a similar manner as the fabric sheets.

Adjacent to one edge of the support 16 and the edge surface E of the stack S, there is shown means for applying a vacuum to the edge surface of the stack to function as the hold-back device.

Figure 2:
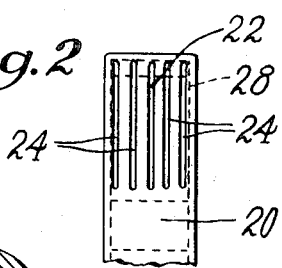
FIG. 2 is a fragmentary front elevational view showing a portion of the structure of FIG. 1 and in particular, showing details of the vacuum hold-back means of the machine of FIG. 1.

The means for applying the vacuum to the surface E is comprised of a chamber 18 formed of a plurality of walls including wall 20. While the vacuum producing means may be positioned otherwise, in the preferred embodiment, the wall 20, as shown, has its outer surface in contact with the stack S at the edge surface E and extends to a point slightly above the stack, the support 16 initially being raised to appropriate height. An opening 22 is provided in the wall 20 in registry with the edge surface E of the fabric piece disposed on the face F of the stack, and extends downwardly along the edge face E in the direction of the heightwise midpoint of the stack. Referring particularly to FIG. 2, it will be noted that the opening 22 as shown in this embodiment is comprised of five slots 24, however, the opening may be formed in any convenient manner, the number of slots and size of opening here being effective to prevent the fabric from being drawn into the chamber 18. In addition, as will be noted from FIG. 5, while the present description is directed to a single chamber 18, it is evident that any number of such chambers may be employed depending upon the size and shape of the material being fed.

Figure 5:
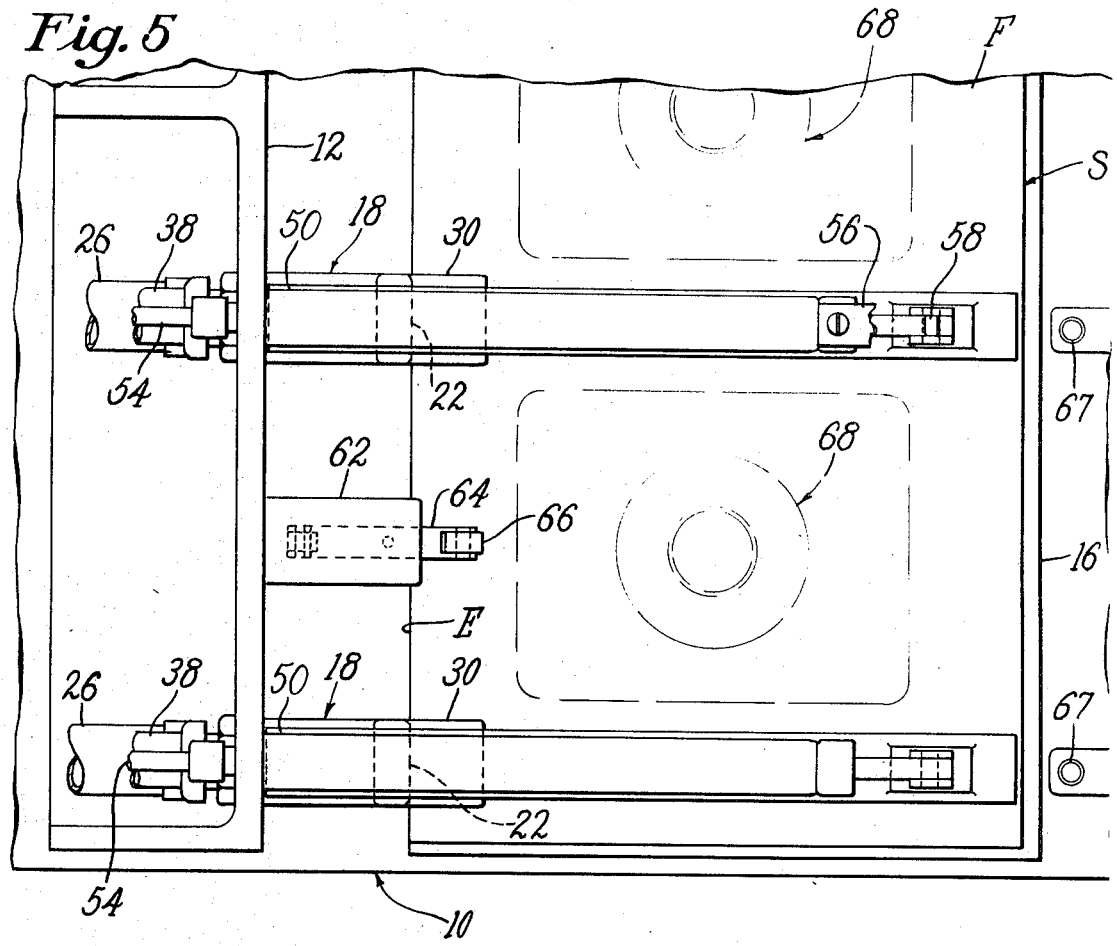
FIG. 5 is a fragmentary plan view showing details of the embodiment of FIG. 1.

Referring to FIG. 1, an opening 23 is provided in the wall 21. A flanged collar 25 provides a connection to a vacuum line 26. The vacuum line 26 is connected to a vacuum source (not shown) such as a blower of the type used in household vacuum cleaners, of relatively low pressure, which produces 2 p.s.i. or less negative pressure. When a plurality of vacuum chambers are to be used, as shown in FIG. 5, they may be connected by T-connections to a single source of vacuum. Also, control valve means may be provided for manually adjusting the vacuum in the chamber 18, neither the T-connection nor a control valve being shown herein nor described as the particular component may be of any type known in the art and as herein used forms no part of the present invention.

Adjacent the opening 22 in the chamber 18, there is provided a baffle plate 28 having a free edge located near but below the level of the face F of the stack, and fastened to the wall 20 by any suitable means. The baffle plate 28 extends generally from side to side with relation to the chamber, for the entire width of the opening 22. Additionally, it will be noted that the baffle plate 28 is canted slightly with respect to the wall 20 so as to permit air to flow through lower portions of the opening 22 while directing the air upwardly over the baffle plate, and to concentrate the major pressure drop to the region immediately adjacent the face.

With the structure thus described, it has been found that a low pressure created in the chamber 18 by application of a vacuum at the line 26 causes air to flow through the stack S and into the chamber through the opening 22. One effect of applying the pressure as shown is to draw the edge surface E against the wall 20 of the chamber 18, and retain alinement of the pieces in the stack. However, it has further been discovered that the effect upon the face F of the stack is such that the top or face sheet of the stack is easily removed from the stack, while the remaining pieces in the stack remain in alignment one with another. The phenomenon described has proved to be effective in the preferred embodiment in removing fabric sheets singly from a stack where a pick-off means is employed to engage the top fabric piece and move it tangentially relative to the face F of the stack S. When the vacuum is aplpied to the chamber 18 each fabric piece is easily moved across the underlying fabric sheet, while that sheet together with the remainder of the stack is undisturbed. In addition, by providing the baffle plate 28, as previously described, air entering the vacuum chamber 18 is drawn upwardly at the surface E which prevents detrimental distortion of the stack S in the region of the top edge.

While the results achieved by the vacuum hold-back device have been set forth above, for an understanding of the principles which are indicated to be involved in the operation, reference should be had to FIG. 14. In the schematic diagram shown in that figure, only the top three plies have been shown by way of example, however, it should be evident to the reader that the same effect is produced at these plies regardless of the number of underlying plies forming the stack.

Considering ply 1, ply 2 and ply 3 as shown in FIG. 14, it will be noted that with the vacuum chamber 18 in operation, air flow passes through each of the plies from the face of the stack toward the opening 20 in the chamber 18. It may be considered that the amount of effective air passing through each of these plies is about the same and may be assumed to act over an area A of substantially equal magnitude for each of the plies considered.

As ply 1 is fed, let us examine the forces acting on ply 2;

(1) $F_{2,1} = [P_1 A + W_1] C_f$ wherein:

$F_{2,1}$ = the force on ply 2 caused by moving ply 1 across the surface of ply 2
$P_1$ = the pressure drop through ply 1 caused by air flow induced by the chamber 18
$A$ = the effective area of a ply through which air flows
$W_1$ = weight of ply 1
$C_f$ = the coefficient of friction of the material.

However, ply 2 receives the restraining forces.

(2) $F_{2,3} = [(P_1 + P_2) A + W_1 + W_2] C_f + h$ wherein, in addition to the symbols described above $F_{2,3}$ = the force tending to retain ply 2 on ply 3
$P_2$ = the pressured rop through ply 2 caused by air flow induced by the chamber 18 and
$W_2$ = the weight of ply 2
$h$ = the horizontal component of force produced by pressure drop and flow along the plane of the ply Therefore, from the foregoing it may be concluded that the net force tending to retain ply 2 in its position on the stack adjacent ply 3 is:

(3) $F_{2,3} - F_{2,1} = (P_2 A + W_2) C_f + h$

With air flowing through the stack, therefore, there is created a differential pressure which is effective to produce a larger force $F_{2,3}$ than force $F_{2,1}$, and results in a net force which facilitates removal of the top sheet without disturbing the underlying plies.

Referring to the above Equation 3, the retaining force provided by the vacuum hold-back device is much larger than $W_2$. It is therefore evident that the hold-back action of the disclosed device may be improved by increasing the pressure drop per ply near the face of the stack and/or increasing the effective area A through which air flow is produced by the vacuum chamber 18.

Referring to FIGS. 1 and 5 it will be further noted that a cover means is provided in the preferred form of a resilient member 30 disposed in substantially horizontal alignment with the ply F. The member 30, as shown has one edge thereof attached to a wall of the chamber 18 and the opposite edge extending from the chamber to overlie a portion of the face sheet F of the stack S. The member 30 may serve to substantially divert the flow of air between the wall 20 and the stack S at the location of the opening 22, and in addition may provide a pressure at the edge surface of the face sheet F to provide distortion of the sheet, and may increase the area of the sheets affected by the air flow.

It will be understood that the hold-back effect can be achieved without detrimental distortion of the face sheet, or disturbing its alignment with the stack. While various means of applying the effect may be employed, the vacuum chamber engaged with the edge surface as shown is presently preferred because of its simplicity, wide applicability, and its high degree of prevention of distortion and misalignment.

For an understanding of the novel pick-off and transfer means of the present invention, particular reference should be had to FIGS. 1 and 5 where it will be observed that the bracket 12 is provided with an arm 32 extending over the stack S in close proximity with the stack face F. The arm 32 comprises an inner tubular member 34 and an outer sleeve 36 which is slidable on the stationary inner member. The tubular member 34 extends through an opening in the bracket 12 and is connected to a vacuum line 38. The vacuum line 38 may be connected to vacuum creating means similar to the line 26, and as was explained with reference to that line 26, may be connected to any suitable means for producing pressure less than atmospheric, such as a small blower motor (not shown) which caused air to flow in the direction of the arrows of FIG. 1. Further, it will be noted that the line 38 has a solenoid valve 40 provided between the vacuum producing means and the tubular member 34 which valve through the leads L1, and L2 is electrically controlled. The solenoid valve 40 serves to open and close the line 38 and otherwise will not be described in detail as such devices are commercially available, and the details of such a valve form no part of the present invention.

Figure 3:
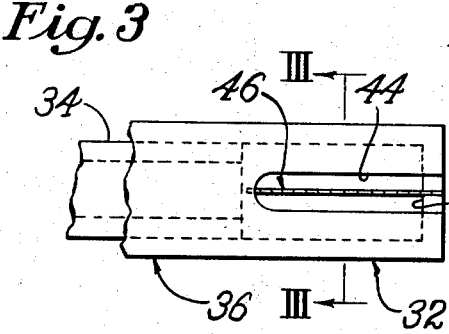
FIG. 3 is a fragmentary plan view showing a portion of the structure of FIG. 1 and in particular, showing details of the novel pick-off means embodied in the machine of FIG. 1 taken on an enlarged scale for clarity.
Figure 3A:
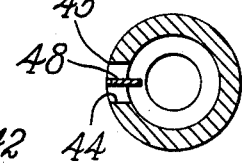
FIG. 3a is a sectional elevational view taken along the lines III—III of FIG. 3 showing further details of the pick-off device of FIG. 1.
Figure 4:
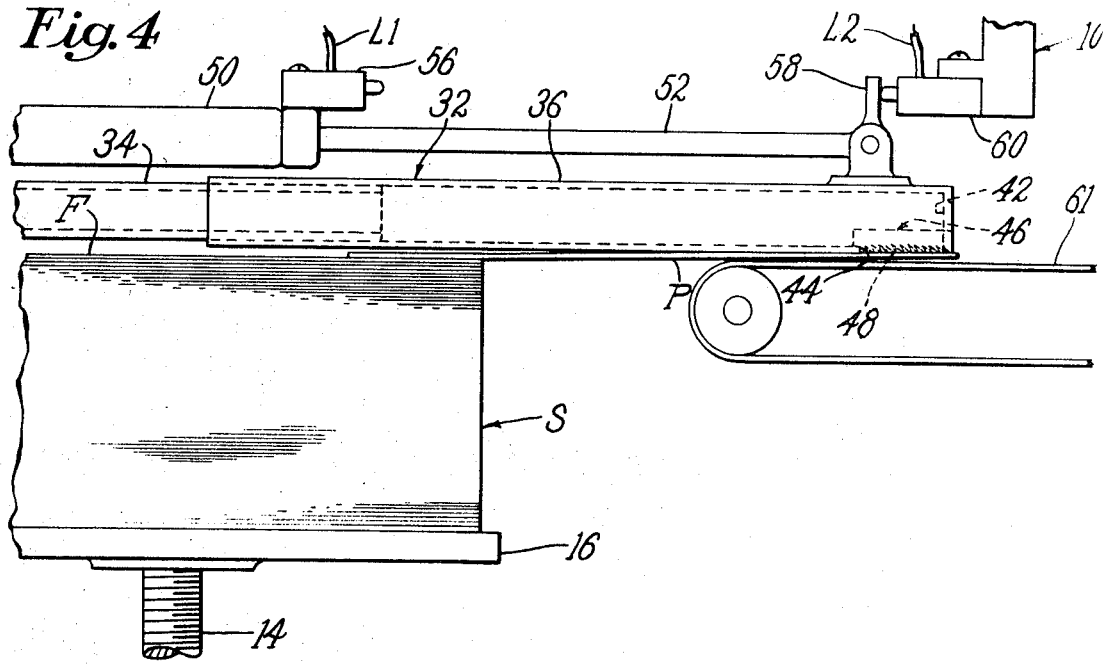
FIG. 4 is a fragmentary elevational view showing a portion of the feeder structure during operation of the embodiment of FIG. 1.

The sleeve 36, as best shown in FIGS. 3 and 3a, is provided with an end wall 42 and a slotted opening 44 having edge surface 45, which opening serves to connect the interior of the tubular member 34 to the atmosphere. A gripping element in the form of a card clothe element 46 is retained by the sleeve 36 within the opening 44 such that a plurality of fabric engaging points 48 of the card cloth are inside the outermost surface of the portion of the sleeve 36 in which the slotted opening is formed. ("Card cloth" as used herein to describe pointed projections which have a unidirectional effect when used for removing fabric sheets is described in my copending application Ser. No. 423,301 filed Jan. 27, 1966, now Pat. No. 3,406,961, issued Oct. 22, 1968 to which reference is made for further details.) In application, therefore, when the card cloth 46 is located in its position as shown in FIG. 1 adjacent the face F of the stack S, the fabric engaging points 48 are generally not in contact with the face of the stack due to the limiting effect of the outermost surface of the sleeve. This is true even though the face F of the stack be brought into contact with the outer surface of the sleeve 36. However, when the valve 40 is opened to apply a low vacuum to the tubular member 34 air is drawn through the slotted opening 44 of the sleeve 36 and is effective to draw the face piece of fabric into engagement with the card cloth 46 or other fabric engaging means which might be disposed within the opening, the edges 45 of the slotted opening also engaging the fabric and limiting the depth of penetration of the points into the fabric. Slidable movement of the sleeve 32 along the tubular member 34 while the vacuum line 38 remains open, is therefore effective to move the card cloth in its fabric pick-off direction i.e. to the right as viewed in FIG. 1 and to thus remove the top fabric ply from the stack by moving it out from under the resilient member 30 while in engagement with the points 48 of the card cloth.

To produce the above-mentioned sliding motion between the tubular member 34 and the sleeve 32, a cylinder 50 is attached to the bracket 12 adjacent the arm 32 as shown in FIGS. 1 and 5. The cylinder 50 has a movable piston rod 52 which is further connected to the sleeve 32 such that fluid pressure flowing into a line 54 connected to the cylinder forces the piston rod out of the cylinder causing movement of the pick-off means by moving the sleeve 36. The piston rod 52 is spring biased toward the bracket 12 such that it returns to the position shown in FIG. 1 upon release of the fluid pressure, which may be hydraulic or pneumatic, in the line 54.

As best shown in FIG. 1, the pick-off or transfer device is further automated by providing a microswitch 56 which is contacted by a flange 58 of the piston rod 52 when the card cloth is disposed adjacent the face F of the stack S, and a second microswitch 60 (FIG. 4) which is contacted by the flange 58 when the sleeve 36 is extended to a second location where the top fabric piece is to be deposited, such as on a conveyor belt 61. Each of the switches 56 and 60 are connected by the lines L1 and L2 respectively to the valve 40. With the elements as shown, circuitry is provided such that the vacuum line 40 is opened when the microswitch 56 is contacted by the flange 58 and remains open until the microswitch 60 is contacted by the flange 58. In the present construction, therefore, the top fabric piece is drawn into contact with the fabric engaging points 48 of the card cloth 46 by the vacuum produced in the tubular member 34, which vacuum remains on until the fabric piece is disposed as in FIG. 4 for release on the conveyor belt 61. At this point, the valve 40 is automatically closed, the arm 32 is moved in an opposite direction to that of the card cloth pick-off direction, and the fabric piece is released on the conveyor belt 62 for transportation to a new location.

In order to maintain the stack S at a location whereby the pick-off means is in close proximity to the face F of the stack, a third microswitch 62 is mounted on the bracket 12 adjacent the top of the chamber 18. The microswitch 62 is provided with a switch arm 64 having a roller 66 for contacting the face F of the stack S. The microswitch 62 is connected to a drive motor which operates the screw 14 to move the support table 16 upwardly whenever the roller 66 drops to a predetermined level. By this operation, the face of the stack is retained at a substantially constant level.

While the microswitch 62 is illustrative as being operative to move support table 16 only in the upward direction in the embodiment shown, it is contemplated, that should it be desirable, to drop the support table in sequence with the operation of the pick-off means, the same could equally as well be accomplished by the switch 62. Such oscillatory work table motion and related circuitry have been shown in detail in U.S. Letters Pat. No. 3,369,803 referred to hereinbefore.

In operation of the device, the fabric stack S is placed on the support table 16 with its edge surface E in contact with the wall 20, and the table is moved upwardly automatically until the roller 66 engages the stack face F. Vacuum means is then initiated to create a negative pressure of about ½ to 1 p.s.i. in the line 26 and a negative pressure of about ½ p.s.i. in the line 38 which is opened by virtue of the valve 40 having received a signal from the microswitch 56 contacted by the finger 58. The aforementioned pressures are given by way of example only, and while having been found acceptable for use with a plurality of fabrics may be varied as dictated by the type of material to be fed.

A cycling device (not shown) is connected to the fluid line 54 such that the piston rod 52 is extended in predetermined timed relation. During operation, each successive fabric piece reaching the face F of the stack S is drawn into engagement with the teeth 48 of the card cloth 46 by the vacuum in the tubular member 34, while the sheet is maintained in a substantially planar configuration by the limiting surface 45 lying closely adjacent the teeth 48. The teeth positively engage the sheet, while penetration is controlled by the limiting effect of surface 45. The sheet is thus ready to be moved by nondeforming positive (hence accurate) drive from the positive position of the stack maintained by the hold-back device. A surge of fluid pressure in the cylinder causes the piston rod 52 to move to its location adjacent the conveyor belt 61, where the vacuum is shut off by the valve 40, and the cylinder moves in the opposite direction, causing the forwardly sloped teeth of the card cloth 46 to slip out of the fabric immediately, the fabric piece being placed in an accurate position on the conveyor belt and freed to move along the conveyor belt to a new location. During operation, the vacuum is continuously applied through the line 26 to the chamber 18 and each successive piece of fabric as it assumes the position on the face F of the stack S is subjected to a selective releasing action caused by air flow through the stack as hereinbefore described.

In employing a plurality of arms 32 for handling a stack S of fabric pieces having an edge which is to be oriented in the new location, a plurality of photocells 67 are employed as shown in FIG. 5. Each of the photocells 67 is connected to a respective solenoid valve (not shown) in the line 54 of the cylinder 50 opposite which the cell is located. As each of the arms 32 reaches the respective photocell 67 at the location where it is desired to deposit the oriented fabric piece, the photocell beam is covered and signals the corresponding solenoid valve to shut down flow of fluid to the cylinder 50. The photocells 67, therefore, serve as separate stops for their respective cylinders 50 and in so doing are capable of precisely orienting the fabric piece as deposited. By providing the photocell arrangement, as shown in FIG. 5, the microswitch 60 may be eliminated and the photocells 67 moved into the circuitry L1 and L2 of the valve 40 to thereby close the valve 40 in addition to closing the solenoid valve in the line 54.

Although the vacuum chamber 18 as disclosed is considered to be effective to selectively release the top fabric ply of the stack when employed with most fabrics used in the garment industry, it is recognized that it might be desirable to provide a supplemental lifting action to the top fabric ply and therefore insure the application of the machine to an even wider range of fabrics and systems. With the machine of FIGS. 1–5, a blow down device 68 may be employed to facilitate release of a top fabric ply, and is shown in phantom lines in FIGS. 1 and 5 of the present embodiment. Such a device was first disclosed in the U.S. Pat. 3,168,307 to R. R. Walton et al., issued Feb. 2, 1965 and was later employed in the machine disclosed in the aforementioned Walton et al. U.S. patent application Ser. No. 571,865. It should be evident to the reader that the use of an arm 32 or a plurality of arms extending over the face F of the stack S in combination with the vacuum chamber 18 does not in any way deter the application of the blow down device 68 to the stack.

Further, as will be noted from FIG. 5, the number of arms 32 or blow down devices 68 which may be employed are, as in the case of vacuum chambers 18, dictated by the width of the stack and the shape of the piece, as well as the particular material which is being transferred.

Referring now to FIGS. 6 through 8 the reader is here shown a second embodiment of the invention wherein a stack S is being fed from the bottom face F to a conveyor belt 70 which passes over a plurality of rollers 72 (only one of which is shown). Here, as in the previous embodiment a vacuum chamber 18 is provided having an opening 22 formed in the wall 20, and located adjacent an edge surface E of the stack. The opening 22, again, is oriented towards the sheets in the stack and extends from an edge of the fabric piece disposed on the stack face F (in this instance the bottom face) heightwise along the edge surface E of the stack in the direction of the heightwise midpoint. The vacuum line 26 is provided as in the previous embodiment to create a low pressure in the chamber 18 and to draw air through the stack S into the opening 22. In effect, the vacuum chamber 18 operates in like manner to that shown in FIG. 1 with the exception of the chamber being inverted in the present embodiment to act upon the bottom face F of the stack S.

The stack S rests upon a plurality of arms 74 (only one of which is shown). The arms 74 are attached to the bracket 73. Each arm 74 comprises an inner tubular member 75 slidably located in an outer fixed sleeve member 76. The inner member 75 has an opening 78 in which fabric engaging means in the form of a row of card cloth 80 is secured and a slotted opening 81 is provided in the outer sleeve 76 in which the card cloth 80 is located when the card cloth is disposed adjacent the stack face F as in FIG. 1. While the various switches as shown in the embodiment of FIG. 1 have not been duplicated in the device being described, it should be evident that the same devices and related circuitry might be used to intermittently create the vacuum in the member 76 and to likewise extend the piston rod 52 in timed sequence.

In operation, therefore, the present device is effective to transfer successive pieces of fabric from the face F of the stack S by creating a vacuum in the tubular member 76 which draws the material into contact with the card cloth 80. The cylinder 50 is then energized to move the piston rod through to the position shown in FIG. 8, at which point the inner member 75 extends between adjacent rollers 72. The vacuum is now shut off in the tubular member 76 and the piston rod 52 is retracted to release the grip of the card cloth 80 on the fabric piece. The fabric piece is then fed along the conveyor belt 70 to a new location.

It should be here emphasized that the embodiment described above is of great importance in an operation where a continuous feed of material is necessary, and even the delay of replacing a spent stack of material can not be tolerated. The stack S, as it is fed from the face F, may be constantly added to by merely placing a new supply of material upon the upper face of the stack. This may be accomplished either manually, or automatic replacement of the material may be made by a switch signaling that a specific level of material has been reached.

Figure 9:
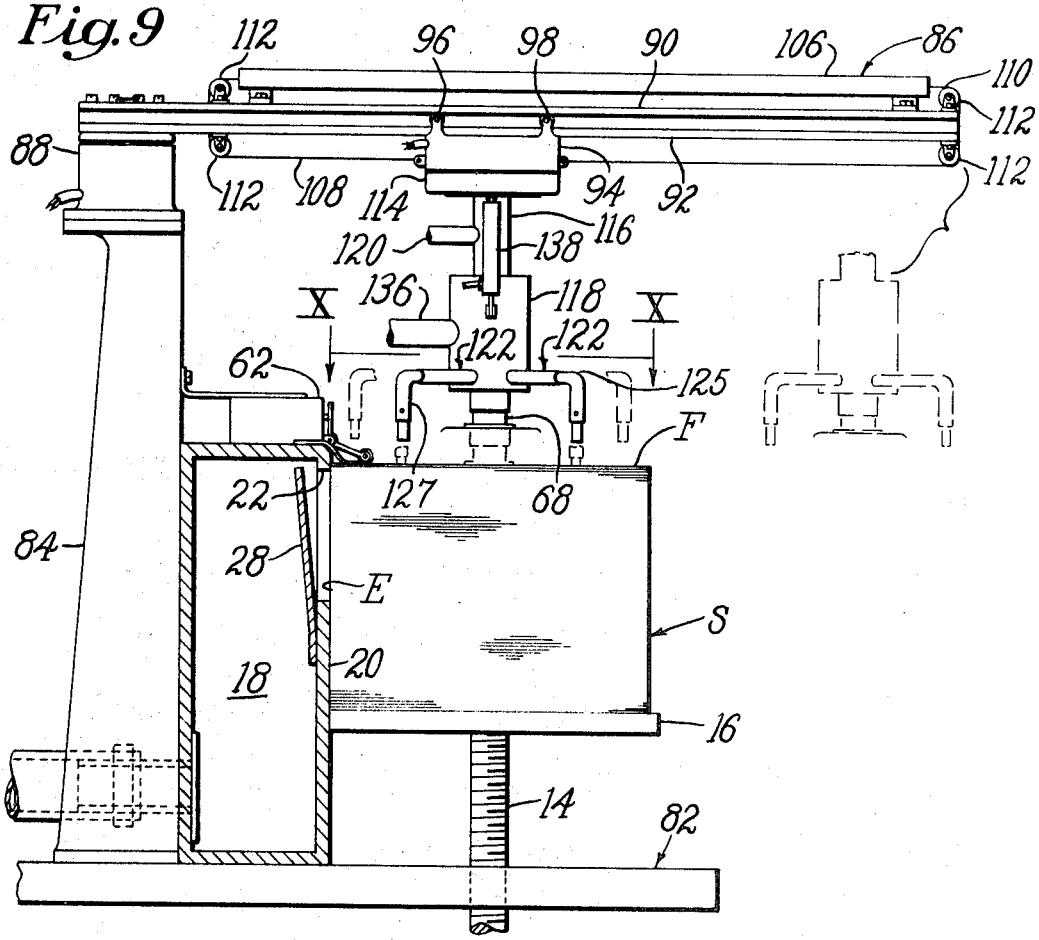
FIG. 9 is an elevational view, partially in section, showing yet another embodiment of a machine for feeding fabric sheets singly from a stack in accordance with the teachings of the present invention.
Figure 10:
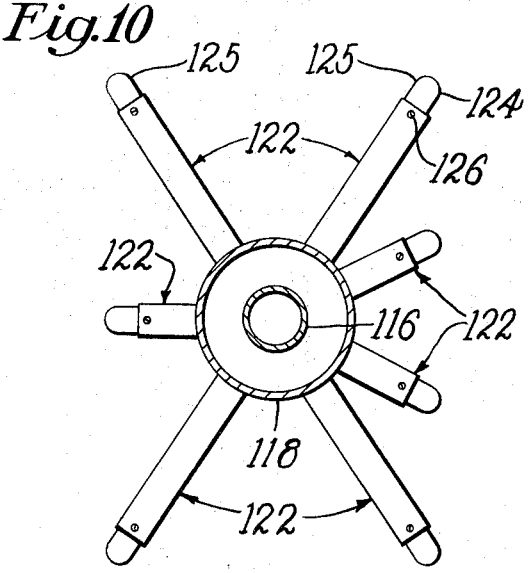
FIG. 10 is a sectional plan view taken along the lines X—X of FIG. 9 showing details of the novel pick-off means embodied in the machine of FIG. 9, taken on an enlarged scale for clarity.
Figure 11:
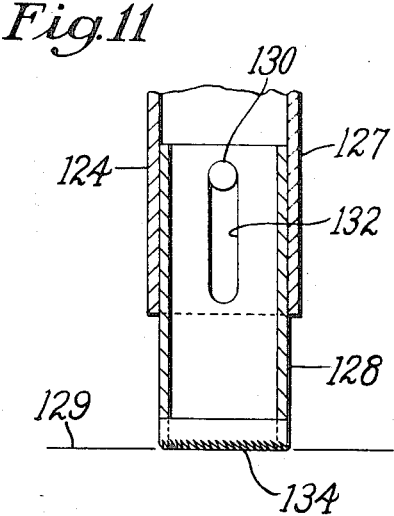
FIG. 11 is a fragmentary sectional view showing a portion of the structure of FIG. 10 and in particular, showing further details of the novel pick-off means of FIGS. 9, and 10 taken on a greatly enlarged scale.
Figure 12:
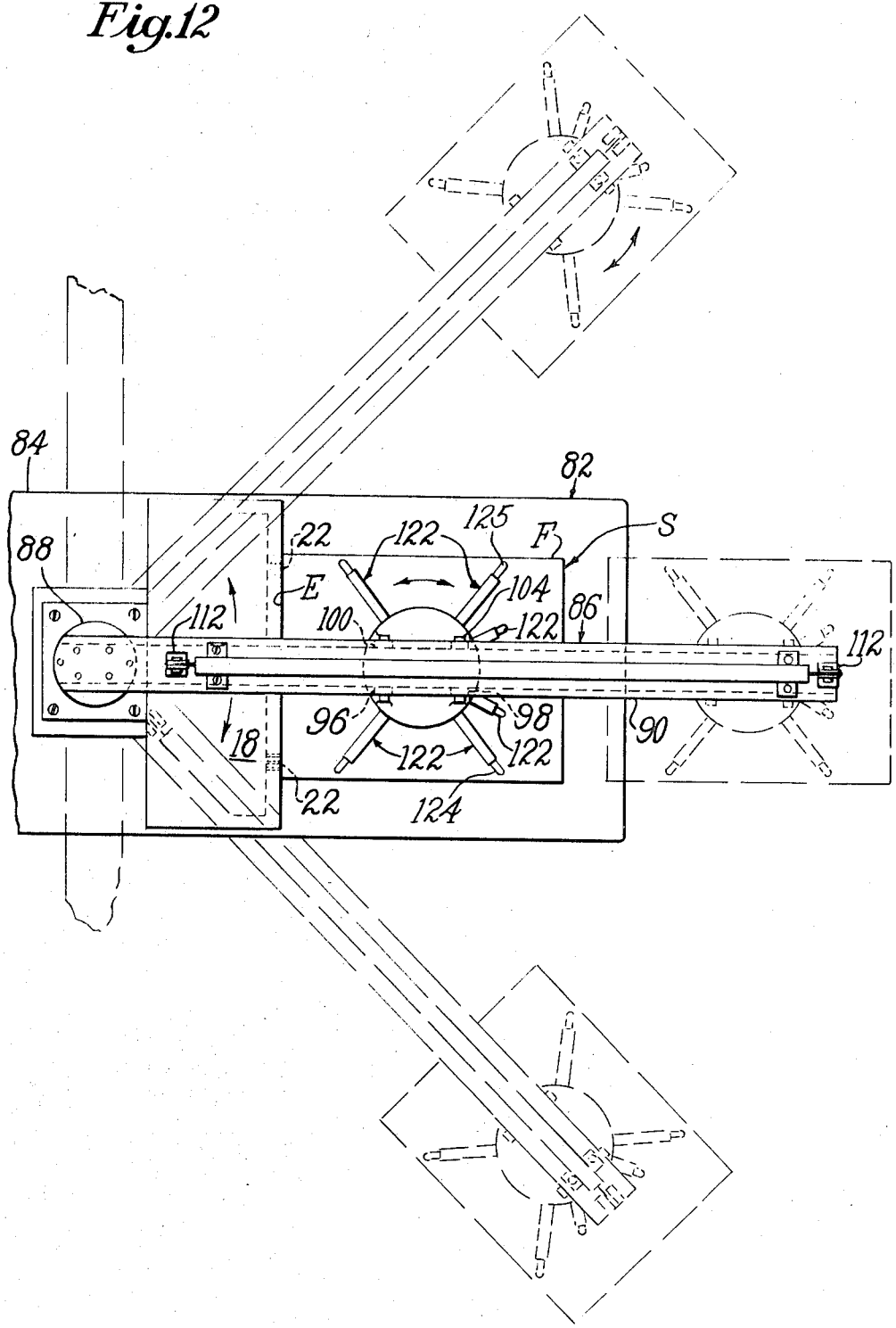
FIG. 12 is a plan view of the embodiment of FIG. 9 showing in phantom line construction elements of the machine in various attitudes during the feeder operation.

While the previously described embodiments have been found to be effective in transferring fabric sheets by relatively linear movement to a stack, conveyor belt, or work station, reference should now be had to FIGS. 9 through 17 where a device employing the teachings of the present invention is shown which is effective to transfer fabric sheets singly to a plurality of conveyor belts, stacks or stations which may be located at substantially any point surrounding the stack S. Referring particularly to FIGS. 9 and 12, there is shown a frame 82 having a support bracket 84 mounted thereon. A vacuum chamber 18 and associated mechanism is provided as in previous embodiments. The support table 16 and the screw 14 function as in previous embodiments, controls and other details being omitted from this embodiment as they are considered to have been fully explained in the description of the prior embodiments.

The novel pick-off device includes an arm 86 extending above the face F of the stack S, having one end operatively connected to an electric motor 88 through appropriate gearing not shown, for movement about a vertical axis. The arm 86 comprises a pair of upper tracks 90 and a pair of lower tracks 92 which extend substantially the entire length of the arm. An electric motor 94 is provided with a pair of rollers 96 and 98 retained between one upper track 90 and one lower track 92 and a second pair of rollers 100 and 104 retained between the other pair of tracks 90 and 92, for movement along the length of the arm 86. The arm 86 is further provided with a double acting cylinder 106 which is fastened to the upper rails 90 and has one end connected by a wire 108 to the motor 94 and the opopsite end connected by a wire 110 to the opposite side of the motor 94. The wires 108 and 110 are each passed over a pair of pulleys 112 such that movement of the piston in the double acting cylinder 106 in a first direction causes movement of the motor 94 in the opposite direction, and movement of the cylinder in a second direction causes movement of the motor in the opposite direction to that of the cylinder.

The motor 94 has a flange 114 operatively connected to its rotor by appropriate gearing not shown, the flange having a tube 116 secured to it by welding or other suitable means. The tube 116 extends through but does not pneumatically communicate with, see FIG. 10, a circular chamber 118, and has at its lower end a blow down device 68 as has been previously described (FIGS. 1 through 5). The tube 116 is suitably connected to a pressure line 120 which serves to intermittently blow air through the tube 116 to the face F of the stack S in the manner as described in the cited Walton U.S. Pat. 3,68,307.

In addition to serving as conduit for the blow down element 68 the tube 116 cooperates with the motor 94 and the chamber 118 to serve as a work head which is movable to a plurality of positions about the stack S for depositing fabric pieces to selected locations.

The chamber 118 is shown to have a plurality of legs 122 each having a portion extending substantially parallel with the face F of the stack S, and another portion extending substantially normal to the face of the stack. As shown in FIG. 10, the specific design of the work head, in the present embodiment, incorporates seven such legs 122. However, as will be evident from the following description of the device, any number of legs may be employed to accommodate various sizes and shapes of fabric pieces.

Referring particularly to FIGS. 10 and 11 it will be noted that each of the legs 122 is vertically straight, extending radically from the chamber 118 and is provided with a tubular right angular member 124 and upper leg 125 of which is slidable in the direction parallel with the stack face F and retained in position by virtue of a setscrew 126. In addition, the lower leg or vertical portion 127 of the tubular member 124 serves as a sleeve for a tubular element 128 which is slidably connected to the lower leg portion 127 by a pin 130 engaging in an elongated slot 132 in the leg 128. The tubular element 128 is provided with a row of card cloth points 134 retained such that the card cloth points do not extend beyond the plane 129 defined by the outer surface of the element 128, and are inclined downwardly, outwardly parallel to arm 86.

Referring now to FIGS. 11 and 13 it will be noted that the element 128 is freely movable within the tubular leg member 127 and should the face F of a stack S assume an irregular surface as is shown in FIG. 13, each of the legs 122 when positioned adjacent the surface will have the element 128 in contact with the surface as the element is moved by gravitational force to the stack face F. Moreover, after the fabric is drawn against the end of tube 128, the vacuum inside the tube will pull the tube 128 upwardly, thus slightly raising the points 134 and the attached fabric piece.

As in the pick-off elements of the embodiments previously described, a source of vacuum is applied to an inlet duct 136 (FIG. 9) and a fabric piece on the face F is drawn into contact with the card cloth points 134 against which it is retained with limited penetration until arrival at a location of release.

Referring back to FIG. 9, it will further be observed that a hydraulic cylinder 138 is interconnected between the flange 114 and the chamber 118 for controlling relative vertical movement between the flange and the chamber. The chamber 118 is slidably mounted on the tube 116 and as is best shown in FIG. 9, may be lifted to the position shown in phantom by operation of the hydraulic cylinder 138.

In operation, the vacuum chamber 18, support table 16 and microswitch 62 all function as heretofore explained with regard to FIGS. 1 through 8. However, in the present embodiment the pick-off device is brought to rest in a position as shown in FIG. 9, at which point in time the hydraulic cylinder 138 releases the pick-off head to position the elements 128 in contact with the stack face F. If the blow down mechanism is to be employed, air is then introduced through the air line 120 to cause a crater effect as described in aforementioned U.S. patent 3,168,307, and a vacuum is introduced at the duct 136 to bring the top fabric piece into contact with the card cloth points 134. The cylinder 106 is now pressurized to move its piston to the left as viewed in FIG. 9, i.e. in the direction toward the bracket 84, thereby moving the motor 94 to right, i.e. to the position shown in phantom line in FIG. 9 with the uppermost sheet attached.

The choice of positioning the piece of fabric now retained on the pick-up arms 122 is dependent on the location of the next operating station, conveyor belt, or stack on which the piece is to be deposited. Should it be desired to move i.e. rotate the fabric pieces to one side of the frame 82, the motor 88 is operated to rotate the arm 86 to either of the positions shown in phantom line in FIG. 12. In either of these positions shown, the motor 94 may now be operated to rotate fabric piece to a variety of positions for orienting the fabric piece as desired. While the various circuitry necessary to set up automatic operation of the motors 88 and 94, and the cylinders 138 and 106 have not been shown, it is suggested that by employing known elements together with electrical and hydraulic techniques, the pick-off head comprising the plurality of legs 122 may be positioned to locate, or orient fabric pieces from the stack S to a number of stations in any sequence desired.

Further, it will be noted that the flexibility of the disclosed fabric pick-off device is such that its adaptability to sizes and shapes of fabrics is far greater than known fabric handling devices. The legs 122 are adjustable such that the tubular elements 128 containing the fabric engaging means will contact a fabric piece of irregular shape near an edge surface, or at locations as desired. Should it be desired to orient an edge surface of the piece in a position for stitching or other operation, a photocell or other device is employed to sense the edge surface and adjust rotation of the chamber 118 through operation of the motor 94, to the desired position. The use of photocell or other means for orientation will not be described in detail here. However, the use of such device has been disclosed in U.S. Letters Patent No. 3,356,237, filed June 10, 1966 in the name of R. R. Walton, for fabric orienting purposes.

Refering now to FIGS. 15 through 17 still another pick-off device is shown which embodies the present invention. Here, the pick-off head comprises a tubular frame 140 having a hollow cross member 142 rotatably mounted thereon. The cross member 142 is interconnected with four substantially parallel tubular members 144 having their ends constructed in accordance with the construction of FIG. 3. That is, a fabric engaging element is provided at each end of the tubular members 144, and disposed in the tubular member in the manner as described with regard to the tubular member 32 shown in FIGS. 1 through 5. Mounted on the frame 140 at one end of the hollow cross member 142 is an electric motor 146. The motor 146 extends through an opening in the frame 140 and is operative to turn a gear 148 which is in meshing engagement with a gear 150 mounted on the cross member 142.

As in operation of the previously described pick-off heads, a vacuum is created in the tubular frame 140 which flows through the cross member 142 and is effective to draw fabric pieces into engagement with the fabric engaging means such as card cloth teeth provided in each of the tubular members 144. However, after initial engagement with the fabric piece is made, the electric motor 146 is operated to rotate the tubular members 144 through the gear train 148, 150. The presently described pick-off device is therefore useful where it is desirable to place fabric pieces on conveyor belts, stacks or work stations which are not in surface alinement with the stack being operated on or to invert and feed a fabric piece to a conveyor belt. It should be evident that this device may be employed in place of the pick-off heads previously described in combination with the vacuum chamber 18, or may be employed in other machines of this type.

Referring now to FIGS. 18 through 22 yet another pick-off device is shown which is adaptable to handle a variety of fabric shapes which might be encountered in the garment industry. The present pick-off device comprises a T-shaped hollow member 152 having a plurality of legs 154. Each of the legs 154 comprises a tubular member 156, rotatably mounted by threaded fastener 158 onto the T-shaped member 152 which opens into the interior of the T-shaped member. The tubular member 156 serves as a sleeve for an element 160 which is slidably retained therein by a setscrew 162. The element 160 is formed from a circular tube which has a right angle bend which is flattened at its end as best shown in FIGS. 21 and 22. In the flattened end of the member 160 a fabric engaging means in the form of a card cloth element 164 is retained.

Here again, a vacuum is created in the T-shaped hollow member 152 and produces the heretofore described pick-off action on a fabric piece disposed adjacent the elements 160. However, in the presently described pick-off device adjustment of the legs 154 may be made to a great number of positions, as depicted in FIG. 19, by loosening the fastener 158 and rotating the legs about the fastener axis. In addition, the elements 160 are extendable and retractable in the legs 154 to reach a distance beyond the T-shaped member 152, as is desired.

The pick-off head described, therefore, is one wherein the card cloth elements 164 are movable to provide a pattern adaptable for the engagement and pick-off of almost any shape of fabric piece to be encountered in the fabric handling field. As with the other pick-off embodiments described, this device may be used together with the various elements of the embodiments shown in FIG. 1, or may be used with other suitable fabric handling devices.

From the foregoing, therefore, it should be evident that the present invention provides a pick-off device which is effective to cleanly remove a single ply of regular or irregular shaped fabric pieces from a stack and to deposit the ply in a plurality of positions at a work station, conveyor, or other stack. While the pick-off devices described have generally been shown to employ a card cloth material as the fabric engaging element thereof, it is possible to employ fabric engaging means other than card cloth with equal success for certain materials to be encountered.

However, it has been found that by employing a row a fabric engaging points as a fabric engaging means, that the length of the exposed points as determined by the limiting surface, may be increased to engage two plies of material when operating on pillow cases or other double ply sheets.

Additionally, although a single card cloth element has been shown in the embodiments described, it should be evident that a number of such strips of card cloth might be employed as the fabric engaging means should it be desired to increase the fabric engaging surface of the fabric pick-off element.

Having thus described my invention, what I claim as new and desire to secure by Letters Patent of the United States is:

1. In a machine for transferring fabric pieces from a face of a stack of edge-aligned pieces, a fabric transferring mechanism, mechanism for causing relative movement between the stack and the fabric transferring mechanism in a straight line, said machine including a support to hold the stack with edges of the fabric pieces near said face aligned with corresponding edges of all other pieces in the stack in a straight line extending in the direction of said relative movement, and a device positioned in the region of said face for preventing displacement from said alignment of the fabric pieces at said face while assisting feeding, said device including a vacuum inlet having a surface parallel to said straight line and located adjacent to and in contact with said edges to produce a flow of air through said region at an angle to the line of said edges and passing through the stack interior and thence outwardly from said aligned edges.

2. The machine of claim 1 wherein the relative movement between the stack and the transferring mechanism is in a vertical straight line and said surface of the vacuum is also vertical.

3. The machine of claim 1 wherein said support comprises a table and a stack-constraining surface extends at a right angle to said table along the edge of said stack at the level of the stack face, said constraining surface being positioned on the same side of the stack as said device.

4. The machine of claim 1 including a cover disposed to lie over said stack face adjacent said edge, said cover adapted to restrict entry of air into the stack in the vicinity of the extreme edge of said face.

5. The machine of claim 4 wherein said cover is free to move against the stack under pressure drop created by said vacuum inlet.

6. The machine of claim 5 wherein said device includes a series of inlets at least one of which includes a baffle plate, said vacuum effective to concentrate major pressure drop to the region immediately adjacent to said face.

7. The machine of claim 6 wherein the opening of the respective vacuum inlets is in the form of elongated slots extending in the direction of said straight line.

8. The machine of claim 7 wherein said mechanism for causing relative movement comprises an elevator raising mechanism movable in a straight path, and said support to hold the stack comprises a support surface movable by said mechanism, said surface having an edge aligned with said straight edge of said stack and said vacuum inlet positioned immediately adjacent a straight line projected through said edge of said surface in the direction of said straight path.

9. In a machine constructed to feed a fabric piece each cycle from a face of a stack of edge-aligned pieces, a fabric transferring mechanism, mechanism for causing relative movement between the stack and the fabric transferring mechanism in a straight line, said machine including a support to hold the stack with edges of the fabric pieces near said face aligned with corresponding edges of all other pieces in the stack in a straight line extending in the direction of said relative movement, and a device positioned in the region of said face for preventing displacement from said alignment of the fabric pieces at said face while assisting feeding, said device including a vacuum inlet adjacent to and in contact with said edges to produce a flow of air through said region at an angle to the line of said edges and passing through the stack interior and thence outwardly from said aligned edges, said transferring mechanism including a device cyclically movable from a pick-up to a delivery position, the pick-up position having a predetermined lateral location relative to said stack face.

10. The machine of claim 9 including a stack-constraining surface that is straight in the direction of said straight line and exposed directly to edges of edge-aligned pieces in said stack at the level of the stack face.

11. The machine of claim 9 wherein said device for producing said flow of air is located along a predetermined edge of said stack, and said transfer device is arranged to move, in its travel away from said pick-up position, in the direction away from said air flow device, over the position of the stack.

12. The machine of claim 11 wherein the pick-up position of said transfer device is located adjacent an edge of said stack lying opposite to the edge whereat said vacuum inlet device is positioned.

13. The machine of claim 10 wherein the transfer device includes a localized pick-up element movable to a predetermined local region of said stack face and adapted to grip and pick up the localized portion of a face piece lying at said position.

14. The machine of claim 10 including a mechanical device constructed to penetrate said face piece and positively engage it for pick-up at said pick-up position.

15. The machine of claim 14 wherein the transfer device includes a limiting surface and fabric penetrating projections, said projections being disposed relative to said limiting surface in a predetermined relation for assuring a depth of penetration no greater than the thickness of a single fabric piece.

16. The machine of claim 15 wherein said projections are defined by card cloth.

17. The machine of claim 13 including a plurality of said localized pick-up elements, said elements spaced apart and movable bodily together to corresponding predetermined local regions of said stack face.

18. In a machine constructed to feed single pieces of permeable fabric from an edge-aligned relation with other pieces, the machine including a support for defining a stack position for superposed edge-aligned fabric pieces including a position for the face piece of the stack, the improvement comprising a transfer device movable between a pick-up and a delivery position, the pick-up position having a predetermined lateral location relative to said face piece position, mechanism to cause relative movement of said stack and said pick-up position in a predetermined straight path, and a hold-back device comprising the combination of a vacuum inlet having a straight surface extending parallel to said predetermined straight path and exposed directly for contact with edges of edge-aligned pieces in said stack position and an air flow generating device positioned in the region of an edge of the stack face and directed to produce an air flow against the position of said face piece which presses the face piece in edge-aligned manner against the second piece, and the second piece in edge-aligned manner against the third piece.

19. The machine of claim 18 wherein the transfer device includes a positive pick-up device constructed to positively engage a local region of said face piece, said pick-up device movable, from its pick-up position, away from said straight surface of said vacuum inlet, in the direction across said stack position.

20. The fabric feeding machine of claim 19 wherein there are a plurality of said hold-back devices positioned along the edge of said stack position.

(References on following page)

References Cited

UNITED STATES PATENTS

| | | | |
|---|---|---|---|
| 1,334,451 | 3/1920 | Hanau | 271—26 |
| 2,819,076 | 1/1958 | Wendt et al. | 271—27 |
| 3,079,147 | 2/1963 | Childs | 271—26 |
| 2,819,075 | 1/1958 | Noon | 271—26 |
| 3,097,760 | 7/1963 | Short | 271—36 |
| 3,168,307 | 2/1965 | Walton | 271—26 |
| 3,260,520 | 7/1926 | Sugden | 271—26 |
| 3,291,480 | 12/1966 | Haddad | 271—1 |
| 3,386,396 | 6/1968 | Jacobs | 271—26 |

HARVEY C. HORNSBY, Primary Examiner

U.S. Cl. X.R.

271—27, 32